United States Patent [19]

Jove et al.

[11] 4,420,776
[45] Dec. 13, 1983

[54] PSK MODULATION IN AC BIAS DATA RECORDING

[75] Inventors: Stephen A. Jove, San Jose; Julian E. Vaughn, Campbell, both of Calif.

[73] Assignee: International Business Machines, Armonk, N.Y.

[21] Appl. No.: 325,711

[22] Filed: Nov. 30, 1981

[51] Int. Cl.³ .............................................. G11B 5/09
[52] U.S. Cl. ...................................... 360/45; 360/51
[58] Field of Search ................ 360/40, 45, 51; 375/56

[56] References Cited

U.S. PATENT DOCUMENTS 3,798,673  3/1974  Koinuma ............................... 360/66
4,055,814  10/1977  Abraham et al. .................. 331/1 A
4,202,017  5/1980  Geffon et al. .......................... 360/45
4,367,496  1/1983  Lesieur .................................. 360/45

Primary Examiner—Vincent P. Canney
Attorney, Agent, or Firm—N. N. Kallman; Otto Schmid, Jr.

[57] ABSTRACT

In a data recording system employing an AC bias signal that is superimposed on the data signal, the AC bias signal is phase modulated to compensate for the difference in the phase angle between the alternating bias and the data signals. The frequency of the AC bias signal is no greater than ten times the frequency of the data signal.

6 Claims, 18 Drawing Figures

⊕ = PROPERLY PLACED BIT    ● = SHIFTED BIT    $\tau$ = SHIFTED BIT

⊕ = PROPERLY PLACED BIT    ● = SHIFTED BIT    τ = SHIFTED BIT ERROR

FIG.6b   ⊙ = PROPERLY PLACED BIT

⊕ PROPERLY PLACED BIT

PSK MODULATION IN AC BIAS DATA RECORDING

DESCRIPTION

Technical Field

This invention relates to an AC bias data recording system.

An object of this invention is to provide an AC bias recording system for processing high density data.

Another object of this invention is to provide an AC bias data recording system in which resultant bit shift caused by the alternating phase angle between the AC bias and data currents is eliminated.

Background Art

It is known that when an AC bias field of a given value is used in magnetic recording systems, the recording process is linear with a good signal to noise ratio. In prior art systems, the current and frequency of the added AC bias signal is generally in the order of 10 times higher than that of the data signal. The very high AC bias frequency is used to avoid the occurrence of beat frequency in the recorded data and minimizes noise in the processed signal.

Due to inefficiencies that occur at the high bias frequencies required for high data rates, it is preferable to use the lowest possible bias/data frequency ratio. At such low ratios it becomes necessary to phase lock the data to the bias frequency. However, the angle between the data and bias currents alternates 180 degrees at every data transition. The resultant combined write current than records a transition in the magnetic medium with every other transition being displaced by approximately half of a bias period. This results in readback data with prerecorded bit shift that will degrade the system performance.

In addition, as the bit density and frequency of the data being recorded becomes higher, an AC signal having a frequency that is 10 times the frequency of the data signal becomes impractical to achieve due to the limitations of the electrical signal components. Furthermore, with very high density data, the clocking window becomes very narrow so that write data bits are characterized by significant bit shift error.

SUMMARY OF THE INVENTION

In accordance with this invention, a high density recording system employs an AC bias signal having a frequency that is a relatively low multiple of the data frequency being recorded. To compensate for bit shift that would occur during the write mode, the phase of the AC bias signal is modulated so that the bias current assumes the same phase angle with respect to the data current at each data transition.

BRIEF DESCRIPTION OF THE DRAWING

The invention will be described in detail with reference to the drawing in which:

FIGS. 6a and 6b are waveforms illustrating the results of phase modulated bias correction of the problem depicted in FIGS. 1a and 1b;

DISCLOSURE OF THE INVENTION

Figure 1A:
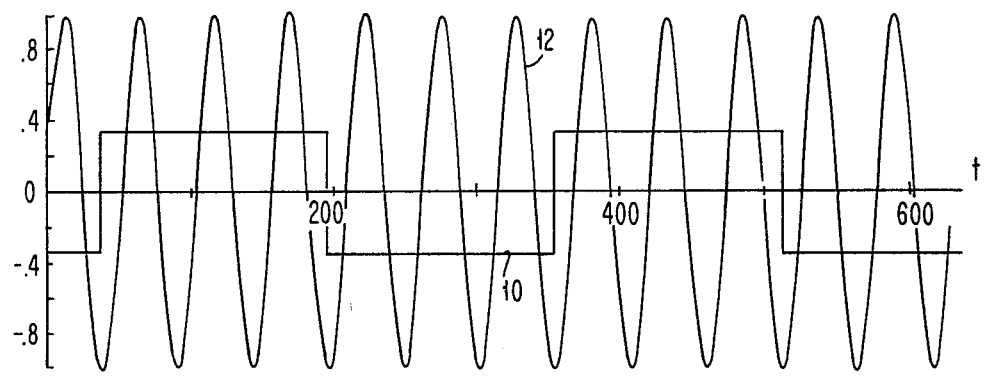
FIGS. 1a and 1b are waveforms illustrating bit shifts of written data, such as occur in prior art systems.
Figure 1B:
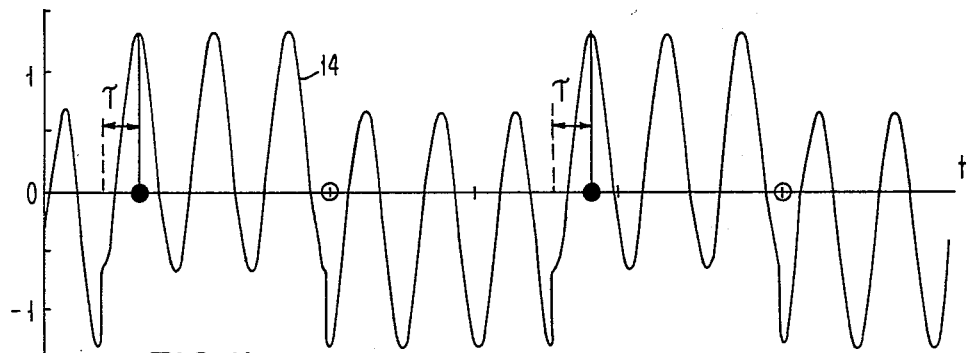

With reference to FIG. 1a, a high frequency data signal represented by the square wave 10 is shown with a sinusoidal AC bias signal 12. In this implementation of the invention, the frequency of the AC bias signal is three times the frequency of the data signal. Since the data is phase locked to the bias frequency, the resultant waveform 14 of the added data and bias signals, illustrated in FIG. 1b, will exhibit bit shift (designated as $\tau$), because the AC bias and data signals are out of phase at every other data transition.

Figure 2A:
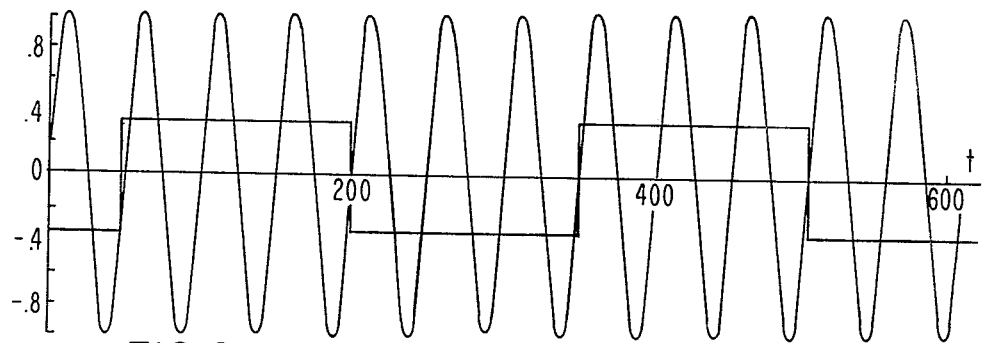
FIGS. 2a and 2b are waveforms illustrating another example of bit shift of written data experienced with prior art systems.
Figure 2B:
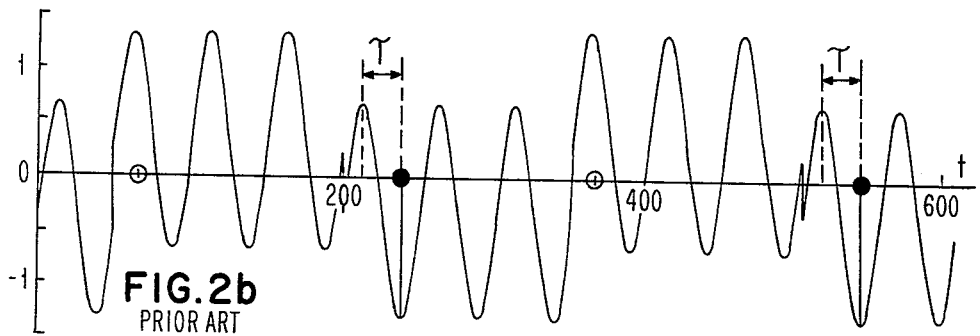

Similarly, FIGS. 2a and 2b illustrate the data signal with transitions occurring at the zero crossings of the AC bias signal. Phase shift in the written data bits also occurs, as with the added bias and data signals of FIGS. 1a and 1b.

In the preferred embodiment of this invention, an AC bias signal is used having a frequency that is three times the frequency of the highest density data signal that is being processed. For example, the data signal may be operating at 32 mHz and the AC bias signal that is to be added to the data would be at 96 mHz, thereby providing a 3:1 ratio. In keeping with this invention, the ratio of AC bias frequency to data frequency is no greater than 10:1.

Figure 3:
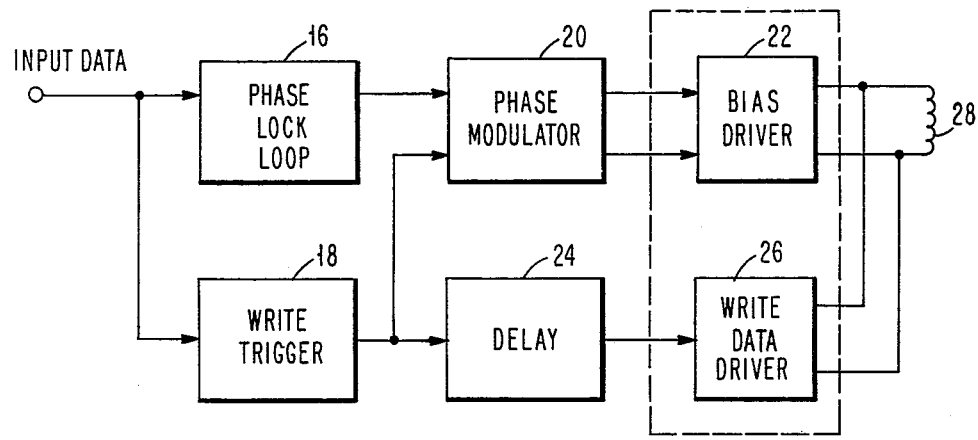
FIG. 3 is a schematic block diagram of the AC bias recording circuit made in accordance with this invention.

To implement this invention, the phase of the bias signal is modulated so that the bias current assumes the same phase angle as the data current at every data transition. To accomplish this phase modulation, the input data signal is applied to a closed loop phase lock oscillator 16, and concurrently to a write trigger logic circuit 18, as illustrated in FIG. 3.

In response to the input data, the phase lock loop 16 provides a phased AC bias signal having a frequency three times that of the highest data frequency. The phase locked AC bias signal is applied to a phase modulator 20.

Concurrently, the input data is applied to a second channel that includes the write trigger 18, in which the data frequency is divided in half (maps RZ data to NRZI data). The divided data signal is fed to the phase modulator 20 in conjunction with the phase locked bias signal. The bias signal is modulated by the data signal and the resultant signal is applied to the bias driver 22. The amount of modulation is determined by the modulation index of the phase modulator. The divided signal is also applied to the delay circuit 24 and delayed by a time that matches the delay of the phase modulator 20 to ensure a proper phase relationship between the data and bias signals. The delay circuit 24 is a conventional LC fixed delay, or may be a programmable delay line. The delayed data signal is then applied to the data driver 26 for application to the write head 28, in conjunction with the modulated bias signal from the bias driver 22.

Figure 4:
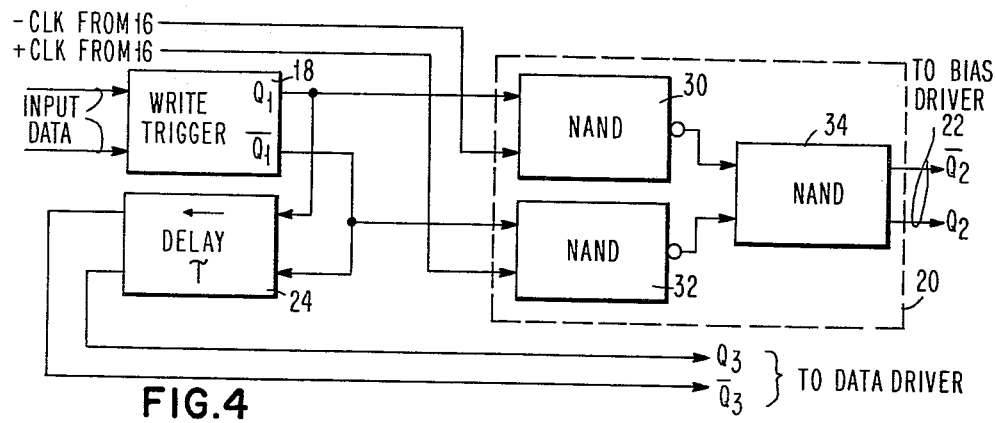
FIG. 4 is a schematic block and circuit diagram of one implementation of the present invention.
Figure 5:
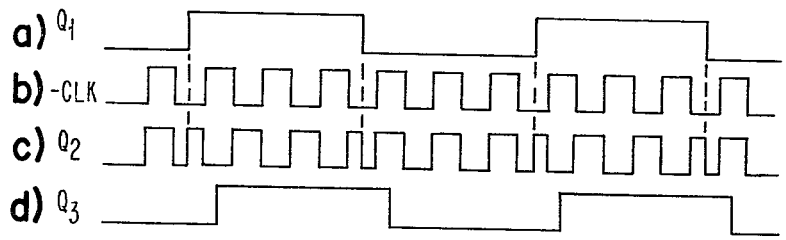
FIGS. 5a-5d are waveforms relating to the circuit of FIG. 4.

With reference to FIG. 4, the phase modulator 20 comprises three NAND logic gates 30, 32, and 34. NAND gates 30 and 32 receive the output $Q_1$ and $\overline{Q}_1$ respectively from write trigger 18 at the frequency F/2 of the data signal, shown in FIG. 5a. The $\overline{Q}_1$ waveform is the inverse of $Q_1$. The negative clock signal (FIG. 5b) from the phase lock oscillator 16 is also applied to NAND gate 30, whereas the positive clock signal is applied to the NAND gate 32. When the write trigger state $Q_1$ is low, NAND gate 30 is triggered to provide an output to NAND gate 34. Similarly, when the write trigger state $\overline{Q}_1$ is low, then NAND gate 32 provides an output to gate 34. Thus, a phase modulated signal $Q_2$, $\overline{Q}_2$, composed of the output of gates 30 and 32 combined by gate 34 (FIG. 5c) is applied to bias driver 22. The outputs $Q_1$, $\overline{Q}_1$ of the write trigger 18 are delayed by a fixed time in delay 24, and the delayed write data signal $Q_3$, $\overline{Q}_3$ (FIG. 5d) is directed to the data driver 26.

Figure 6A:
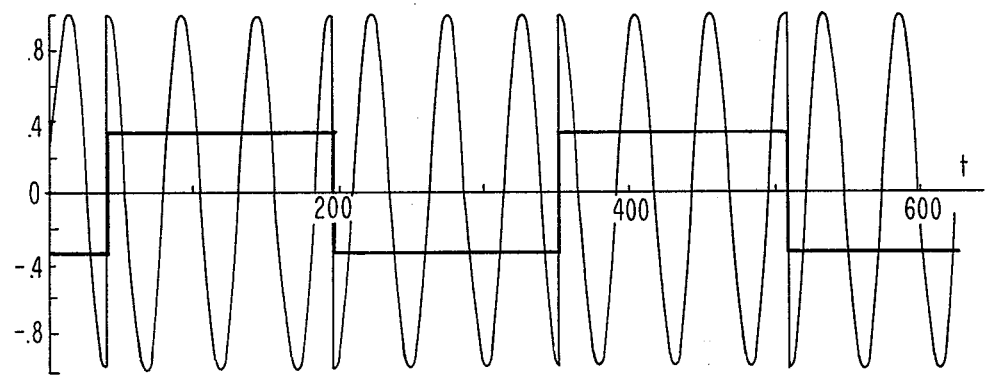

FIG. 6a depicts the results of the added bias and data signals with the data phase locked to the phase modulated bias. FIG. 6b shows the properly placed data bits occurring at the zero crossings.

Figure 7:
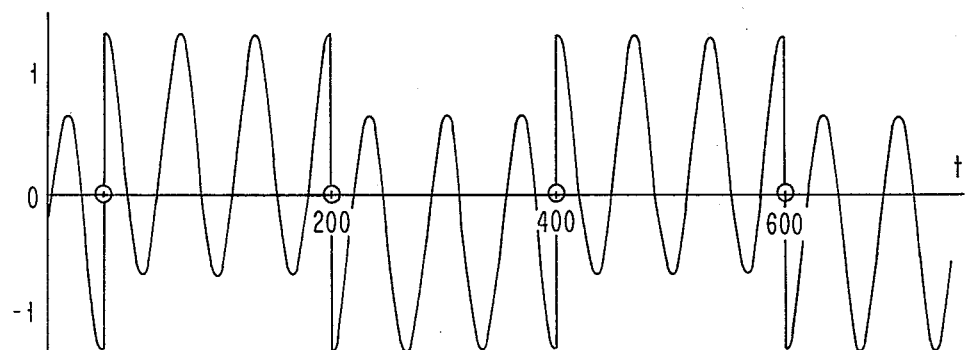
FIG. 7 is a schematic block and circuit diagram of an alternative implementation of the invention.
Figure 7:
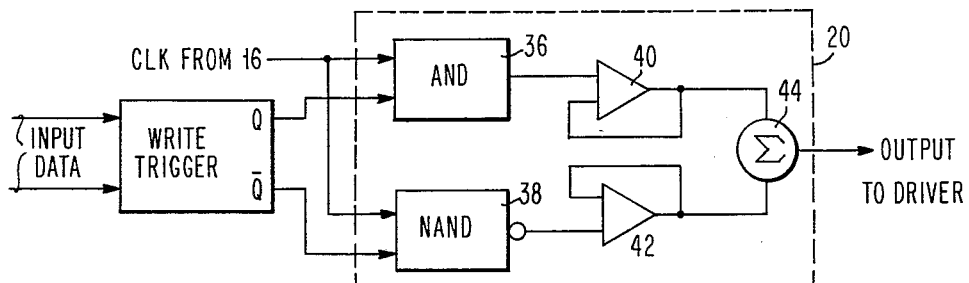
Figure 8:
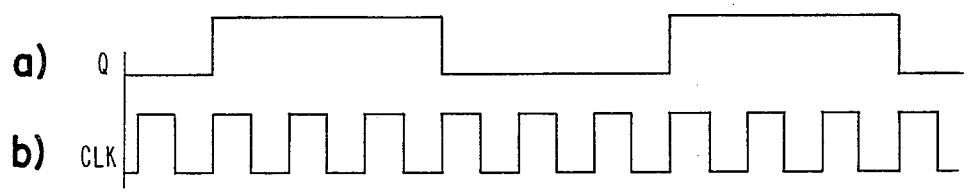
FIGS. 8a-8c are waveforms relating to the circuit of FIG. 7.

Another implementation of the invention is illustrated in FIG. 7, in which the phase modulator 20 comprises AND gate 36, NAND gate 38, a differential amplifier consisting of amplifiers 40 and 42, and a summer 44. The differential signal Q, $\overline{Q}$ (FIG. 8a) is applied respectively to AND gate 36 and NAND gate 38 in conjunction with a clock signal (FIG. 8b) from the phase lock oscillator 16. The outputs of logic gates 36 and 38 are applied respectively to a differential amplifier consisting of amplifiers 40 and 42. The differential signal is then fed to the summer 44 which provides the combined signal output (FIG. 8c) to a driver preceding the magnetic head.

Figure 9A:
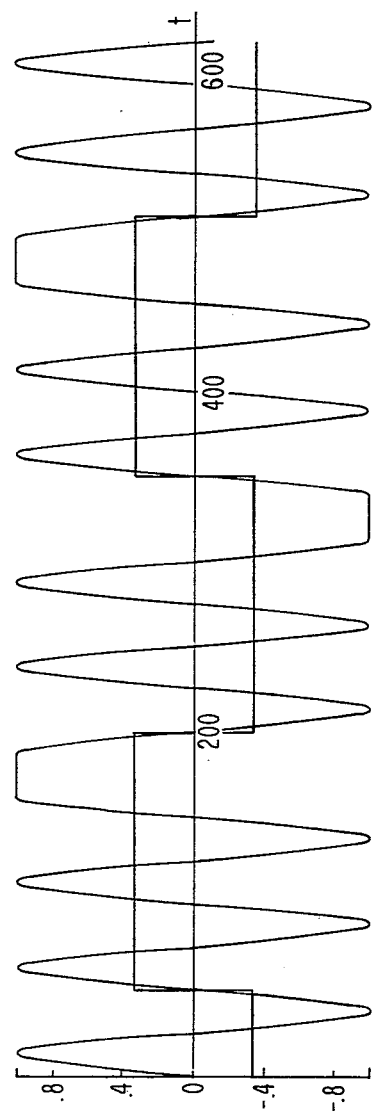
FIGS. 9a and 9b are waveforms illustrating the results of another method of phase modulated bias correction of the problem depicted in FIGS. 1a and 1b.
Figure 9B:
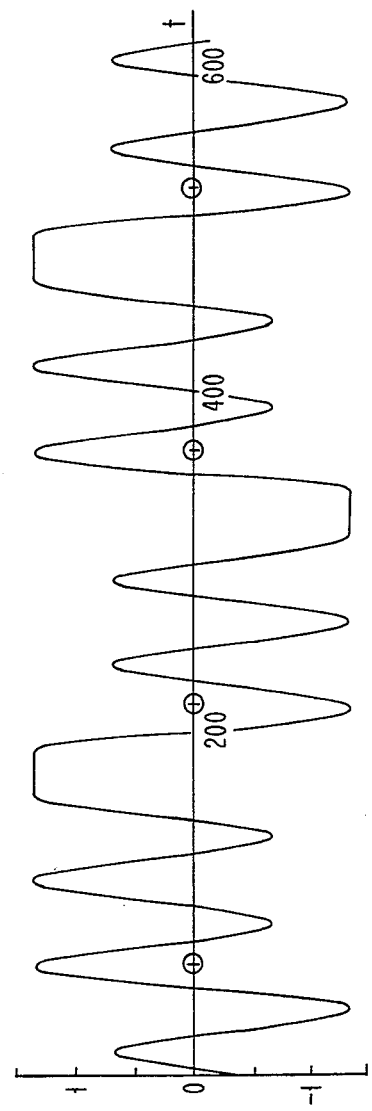

FIGS. 9a and 9b depict the results of using a different delay 24 than that used to generate waveforms 6a and 6b.

FIG. 9a represents the added bias and data signals, with the data phase locked to the phase modulated bias. FIG. 9b displays the combined data and bias current signals, showing the properly placed bits corresponding to the data transitions, as a result of the bias phase correction.

In accordance with this invention, the phase modulation of the AC bias in one channel and the synchronizing of the data to the AC bias ensure that the phase relationship between bias and data currents remain consistent at every data transition when the combined write current is applied to the magnetic recording head. Another feature of the invention is that the use of relatively low bias frequency requires less power than conventional bias systems.

What is claimed is:

1. An apparatus for recording a high frequency data signal having first and second signal processing channels, said first channel comprising a phase lock loop for receiving high frequency input data signals and for providing an AC bias signal having a frequency that is a multiple of the frequency of said data signal, wherein the ratio of said frequencies is no greater than 10:1; and
   a phase modulator coupled to the output of said phase lock loop for modulating the phase of said AC bias signal;
   said second channel comprising a write trigger circuit for dividing said data frequency; and
   driver means coupled to said phase modulator and said write trigger; and
   a magnetic head coupled to the output of said driver means for receiving the combined data and bias signals, wherein said data and bias signals are phase locked such that bit shift error is eliminated.

2. An apparatus for recording a high frequency data signal as in claim 1, wherein said driver means comprises a bias driver in said first channel and a data driver in said second channel for providing bias and data signals to said magnetic head.

3. An apparatus for recording a high frequency data signal as in claim 2, including a delay circuit coupled between said write trigger and said data driver for compensating for timing displacement by said phase modulator.

4. An apparatus for recording a high frequency data signal as in claim 1, wherein said phase modulator comprises first and second logic circuits coupled to said write trigger and to said phase lock loop, and a third logic circuit coupled to said first and second logic circuits.

5. An apparatus for recording a high frequency data signal as in claim 4, wherein said logic circuits are NAND gates.

6. An apparatus for recording a high frequency data signal as in claim 1, wherein said phase modulator comprises an AND gate and a NAND gate coupled to the output of said phase lock loop and said write trigger, a differential amplifier coupled to said gates, and a summer coupled to said differential amplifier for providing a combined AC bias and data signal.

* * * * *